(12) United States Patent
Phillips et al.

(10) Patent No.: US 10,690,275 B2
(45) Date of Patent: Jun. 23, 2020

(54) CONNECTION TIP FOR A FLEXIBLE LINE, AND ASSOCIATED FLEXIBLE LINE AND MOUNTING METHOD

(71) Applicant: TECHNIP FRANCE, Courbevoie (FR)

(72) Inventors: Paul Phillips, Bois Guillaume (FR); Juan Caicedo, Saint Romain de Colbosc (FR)

(73) Assignee: TECHNIP FRANCE (FR)

( * ) Notice: Subject to any disclaimer, the term of this patent is extended or adjusted under 35 U.S.C. 154(b) by 26 days.

(21) Appl. No.: 16/066,556

(22) PCT Filed: Dec. 29, 2016

(86) PCT No.: PCT/EP2016/082818
§ 371 (c)(1),
(2) Date: Jul. 17, 2018

(87) PCT Pub. No.: WO2017/114888
PCT Pub. Date: Jul. 6, 2017

(65) Prior Publication Data
US 2019/0017641 A1 Jan. 17, 2019

(30) Foreign Application Priority Data
Dec. 29, 2015 (FR) ..................................... 15 63440

(51) Int. Cl.
*F16L 33/01* (2006.01)
(52) U.S. Cl.
CPC .................................. *F16L 33/01* (2013.01)
(58) Field of Classification Search
CPC ... F16L 9/14; F16L 33/01; F16L 33/00; F16L 33/22; F16L 33/26
(Continued)

(56) References Cited

U.S. PATENT DOCUMENTS

| 2,490,686 A | * | 12/1949 | Guarnaschelli | ......... | F16L 33/26 |
| | | | | | 285/107 |
| 2,610,869 A | * | 9/1952 | Allison | ................... | F16L 33/01 |
| | | | | | 285/222.5 |

(Continued)

FOREIGN PATENT DOCUMENTS

| CN | 103026117 A | 4/2013 |
| FR | 2 816 389 A1 | 5/2002 |

(Continued)

OTHER PUBLICATIONS

FR 2816389 translation (Year: 2002).*
(Continued)

*Primary Examiner* — Aaron M Dunwoody
(74) *Attorney, Agent, or Firm* — Ostrolenk Faber LLP (57) ABSTRACT

A connection end-fitting for a flexible fluid transport line, the flexible line includes a pressure sheath, an interlocked pressure vault and at least one traction armor layer; the armor layer includes a plurality of armor elements; the end-fitting includes: an end region of the interlocked pressure vault, an end segment of each armor element, an end vault and a cover, a front sealing assembly of the pressure sheath, a system for locking the interlocked pressure vault relative to the end vault; the locking system includes a curved holding assembly that is radially mounted between the end region of the interlocked pressure vault and the front crimping flange.

15 Claims, 5 Drawing Sheets

(58) Field of Classification Search
USPC .......................................... 285/222.1–222.5
See application file for complete search history.

(56) References Cited

U.S. PATENT DOCUMENTS

| | | | | |
|---|---|---|---|---|
| 3,667,112 | A * | 6/1972 | Chevalier | F16L 33/2076 29/508 |
| 4,033,612 | A * | 7/1977 | Chevalier | F16L 11/083 285/222.4 |
| 4,106,528 | A * | 8/1978 | Laing | F16L 9/14 138/130 |
| 5,860,682 | A | 1/1999 | Belcher | 285/222.1 |
| 6,360,781 | B1 * | 3/2002 | Braad | F16L 25/08 138/109 |
| 6,412,825 | B1 * | 7/2002 | Langkjaer | F16L 33/01 285/222.1 |
| 2005/0071978 | A1 * | 4/2005 | Burke | F16L 33/01 29/456 |
| 2005/0285401 | A1 * | 12/2005 | Treichel | F16L 19/065 285/382 |
| 2007/0024051 | A1 * | 2/2007 | Witz | F16L 33/01 285/242 |
| 2009/0308478 | A1 * | 12/2009 | Vo | F16L 11/08 138/109 |
| 2016/0123505 | A1 * | 5/2016 | Damiens | F16L 11/083 138/133 |
| 2016/0319972 | A1 * | 11/2016 | Dehais | B25B 27/10 |
| 2018/0106405 | A1 * | 4/2018 | Peckeu | F16L 33/224 |
| 2019/0003921 | A1 * | 1/2019 | Nicolas | F16L 11/083 |
| 2019/0017641 | A1 * | 1/2019 | Phillips | F16L 33/01 |

FOREIGN PATENT DOCUMENTS

| | | |
|---|---|---|
| FR | 3 016 020 A1 | 7/2015 |
| WO | WO 2013/083597 A1 | 6/2013 |

OTHER PUBLICATIONS

International Search Report dated Mar. 16, 2017 in corresponding PCT International Application No. PCT/EP2016/082818.
Written Opinion dated Mar. 16, 2017 in corresponding PCT International Application No. PCT/EP2016/082818.
Preliminary Search Report dated Sep. 8, 2016 in corresponding French Patent Application No. 1563440.

* cited by examiner

FIG.6

CONNECTION TIP FOR A FLEXIBLE LINE, AND ASSOCIATED FLEXIBLE LINE AND MOUNTING METHOD

CROSS-REFERENCE TO RELATED APPLICATIONS

The present application is a 35 U.S.C. §§ 371 national phase conversion of PCT/EP2016/082818, filed Dec. 29, 2016, which claims priority of French Patent Application No. 15 63440, filed Dec. 29, 2015, the contents of which are incorporated by reference herein. The PCT International Application was published in the French language.

TECHNICAL BACKGROUND

The present invention relates to a connection end-fitting for a flexible fluid transport line, the flexible line comprising a pressure sheath, an interlocked pressure vault arranged outwardly relative to the pressure sheath and at least one traction armor layer arranged outwardly relative to the interlocked pressure vault, the armor layer comprising a plurality of armor elements, the end-fitting comprising:
  an end region of the interlocked pressure vault,
  at least one end segment of each armor element,
  an end vault and a cover fastened on the end vault, the end vault and the cover defining a chamber between them for receiving each end segment of the armor elements,
  a front crimping flange of the pressure sheath attached on the end vault and arranged outwardly relative to the end region of the interlocked pressure vault,
  a system for locking the interlocked pressure vault relative to the end vault.

The flexible line is advantageously a flexible pipe of the unbonded type designed to transfer hydrocarbons through a body of water, such as an ocean, sea, lake or river. Alternatively, the flexible line is an umbilical reinforced by armor elements or a cable.

Such a flexible pipe is for example made according to normative documents API 17J (Specification for Unbonded Flexible Pipe) and API RP 17B (Recommended Practice for Flexible Pipe) established by the American Petroleum Institute.

The pipe is generally formed by a set of concentric and superimposed layers. It is considered "unbonded" within the meaning of the present invention when at least one of the layers of the pipe is able to move longitudinally relative to the adjacent layers when the pipe is bent. In particular, an unbonded pipe is a pipe with no bonding materials connecting the layers forming the pipe.

The pipe is generally positioned through a body of water, between a bottom assembly, designed to collect the fluid mined in the bottom of the body of water, and a floating or stationary surface assembly designed to connect and distribute the fluid. The surface assembly may be a semisubmersible platform, an FPSO or another floating assembly.

Some of these pipes are used under very harsh conditions. Thus, the transport of hydrocarbons may have a very high pressure and temperature, for example a pressure comprised between 500 bars and 1500 bars, and a temperature comprised between 110° C. and 130° C. Furthermore, in the case where the pipe is submerged at a great depth, said pipe must be capable of withstanding a very high outside pressure, for example approximately 250 bars if the pipe is submerged at a depth of 2500 meters.

The pipes intended for great depths must also withstand very high tensions, commonly several tens of tons, to which they are subjected during use and/or during their installation at sea.

Furthermore, in the case where the surface assembly is floating and movable based on the sea conditions, the risers connecting the seabed to the surface assembly may sometimes be subject to millions of curve variation cycles. These risers must therefore also be cable of lastingly withstanding dynamic fatigue stresses.

The connection end-fittings, which are especially stressed, must also be designed to withstand such usage conditions.

However, the existing flexible pipe end-fittings sometimes have weak areas at the connection of the pressure vault of the flexible pipe to the tip. Such weak areas can cause an axial displacement, or even a separation of the pressure vault relative to the tip.

SUMMARY OF THE INVENTION

One aim of the invention is to decrease the risks of axial displacement and/or breaking of the pressure vaults of flexible pipes at the tips of such pipes.

To that end, the invention relates to a tip of the aforementioned type, wherein the locking system comprises a curved holding assembly that is radially mounted between the end region of the interlocked pressure vault and the front crimping flange.

The tip according to the invention may comprise one or more of the following features, considered alone or according to any technically possible combination(s):
  the holding assembly comprises at least two separate circumferential members, preferably at least three separate circumferential members.
  each circumferential member is in the form of a curved plate.
  the circumferential members are distributed along the perimeter of a same cross-section of the interlocked pressure vault.
  the circumferential members are spaced circumferentially apart from one another on the interlocked pressure vault by no more than 10 millimeters.
  the circumferential members are made from carbon steel.
  the interlocked pressure vault comprises at least one groove, the holding assembly comprising ribs complementary to the groove.
  the ribs of the holding assembly are inserted without being screwed in the groove of the interlocked pressure vault.
  the locking system comprises members for axially locking the holding assembly on the front crimping flange advantageously chosen from among bolts, headless screws, blunt end screws, and cup-point screws.
  the locking system comprises a holding ring arranged between the interlocked pressure vault and the front crimping flange and in contact with the holding assembly.
  the holding ring forms, with the interlocked pressure vault, a housing for maintaining the holding assembly, the holding assembly being inserted into the maintaining housing.

The invention also relates to a flexible line comprising:
  at least one pressure sheath;
  at least one interlocked pressure vault arranged outwardly relative to the pressure sheath, at least one traction armor layer arranged outwardly relative to the interlocked pressure vault, the armor layer comprising a plurality of armor elements, at least one tip as defined above.

The invention also relates to a method for mounting a tip of the aforementioned type, comprising the following steps:

providing the end region of the interlocked pressure vault arranged around the pressure sheath, placing the front crimping flange around the end region of the interlocked pressure vault, mounting the front crimping flange on the end vault, characterized in that the method further comprises mounting the system for locking the interlocked pressure vault relative to the end vault, the locking system comprising a curved holding assembly that is radially mounted between the end region of the interlocked pressure vault and the front crimping flange.

The mounting method according to the invention may comprise the feature according to which the holding assembly comprises at least two separate circumferential members, the method comprising pressing, without screwing, each circumferential member on the interlocked pressure vault.

The invention will be better understood upon reading the following description, provided solely as an example and done in reference to the appended drawings, in which:

DESCRIPTION OF EMBODIMENTS

In the rest of this document, the terms "outer" and "inner" are generally to be understood radially relative to an axis X-X' of the conduit, the term "outer" being understood as being relatively radially further from the axis X-X' and the term "inner" being understood as being relatively radially closer to the axis X-X' of the conduit.

The terms "front" and "rear" are to be understood axially relative to an axis X-X' of the conduit, the term "front" being understood as being relatively further from the middle of the conduit and closer to one of its ends, the term "rear" being understood as being relatively closer to the middle of the conduit and further from one of its ends. The middle of the pipe is the point of the pipe situated at equal distances from the two ends thereof.

Figure 1:
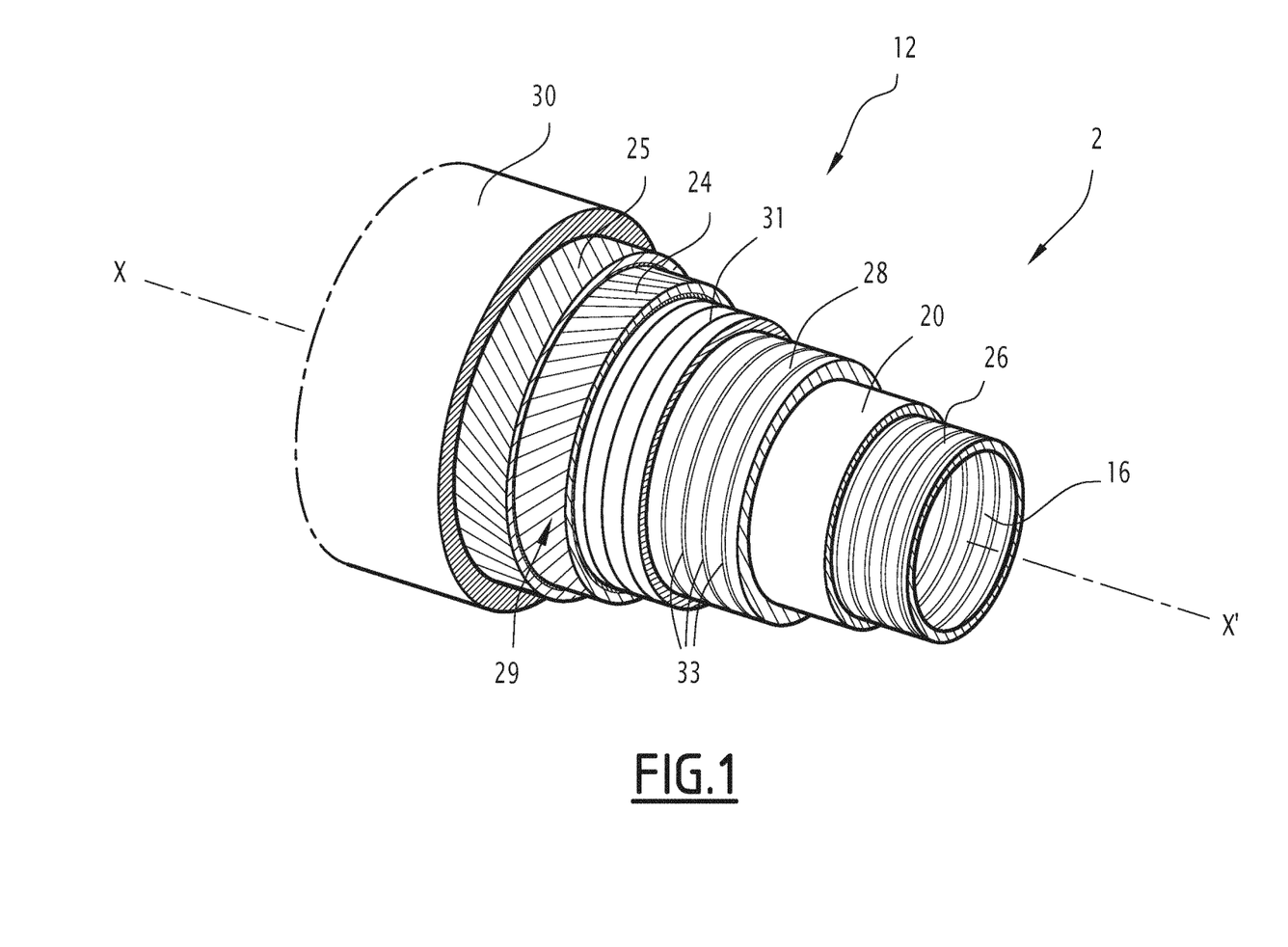
FIG. 1 is a partial cutaway perspective view of a central segment of a flexible pipe.

A first example of the flexible line 2 is partially illustrated in FIG. 1. In the example described below, the flexible line 2 is a flexible pipe. Alternatively, the flexible line 2 is a cable or an umbilical.

Figure 2:
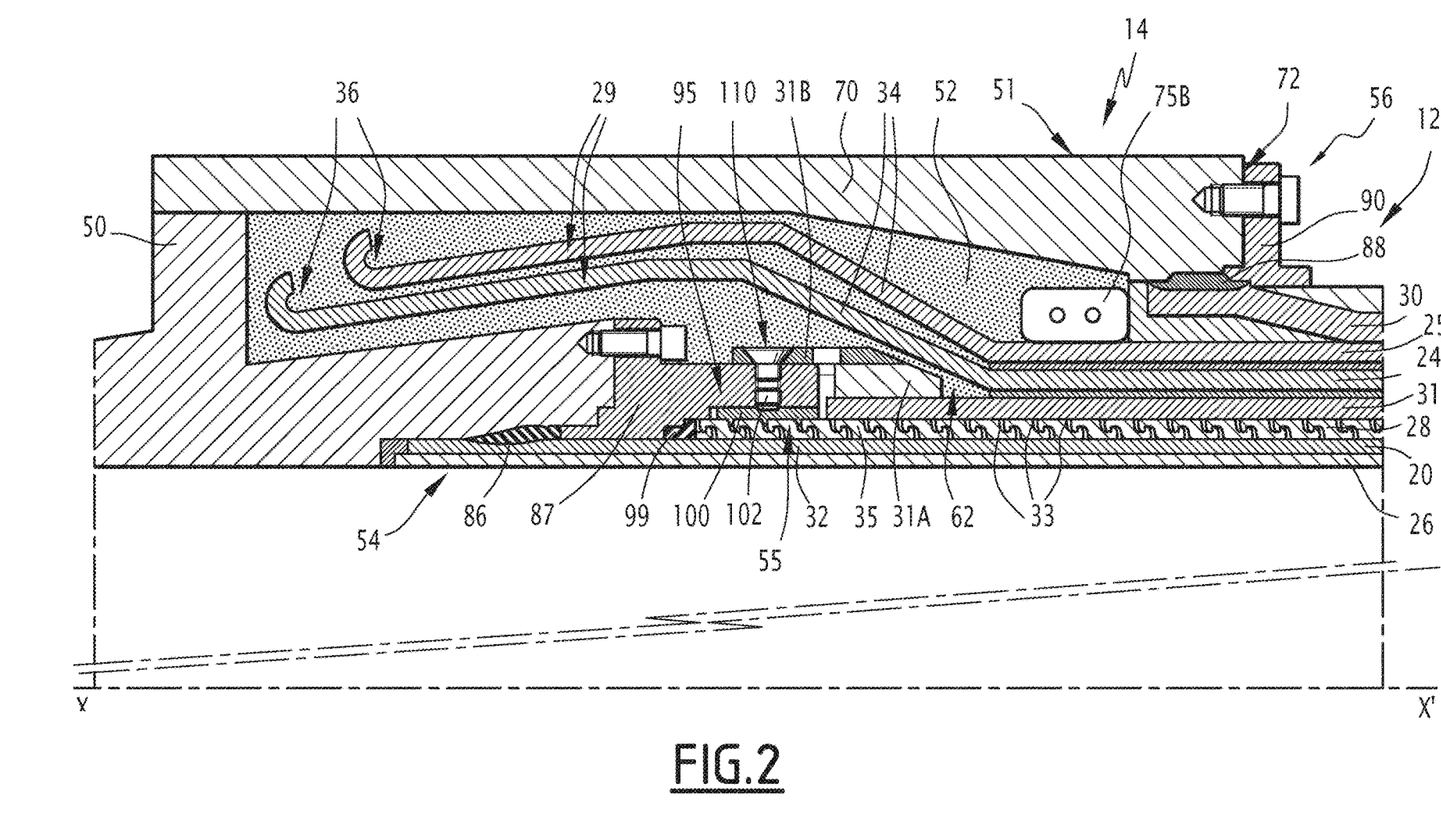
FIG. 2 is a partial half-sectional view, along an axial median plane, of a tip of the pipe of FIG. 1 according to a first embodiment of the invention.

The flexible pipe 2 comprises a central segment 12 partially illustrated in FIG. 1. It comprises, at each of the axial ends of the central segment 12, an end tip 14, the relevant parts of which are shown in FIG. 2. Aside from the tip 14, FIG. 2 shows a part of the central segment 12 adjacent to the tip 14.

In reference to FIG. 1, the pipe 2 defines a central passage 16 for the flow of a fluid, advantageously an oil fluid. The central passage 16 extends along an axis X-X', between the upstream end and the downstream end of the pipe 2. It emerges through the tips 14.

The flexible pipe 2 is designed to be positioned through a body of water (not shown) in a fluid exploitation facility, in particular for hydrocarbons.

The body of water is for example a sea, lake or ocean. The depth of the body of water at the fluid exploitation facility is for example comprised between 500 m and 3000 m.

The fluid exploitation facility comprises a surface assembly, in particular floating, and a bottom assembly (not shown), which are advantageously connected to one another by the flexible pipe 2.

The flexible pipe 2 is preferably an "unbonded" pipe.

At least two adjacent layers of the flexible pipe 2 are free to move longitudinally relative to one another when the pipe bends.

Advantageously, all of the layers of the flexible pipe are free to move relative to one another. Such a pipe is for example described in normative documents API 17J and API RP 17B, published by the American Petroleum Institute (API).

As illustrated by FIG. 1, the pipe 2 delimits a plurality of concentric layers around the axis X-X', which extend continuously along the central segment 12 up to the tips situated at the ends of the pipe.

In the examples illustrated in FIGS. 1 and 2, the pipe 2 comprises at least one first tubular sheath 20 with a base of a polymer material advantageously forming a pressure sheath.

The pipe 2 further comprises at least one traction armor layer 24, 25 positioned outwardly relative to the pressure sheath 20.

In this example, the pipe 2 further comprises an inner carcass 26 positioned inside the pressure sheath 20.

The pipe 2 also comprises a pressure vault 28, 31 inserted between the pressure sheath 20 and the traction armor layer(s) 24, 25.

In the embodiment illustrated in FIGS. 1 and 2, the pressure vault 28, 31 is made up of two superimposed layers.

The innermost layer of the pressure vault 28, 31 is the interlocked pressure vault 28, which is in contact with the pressure sheath 20. The interlocked pressure vault 28 is made up of one or several wires helically wound with a short pitch to form turns interlocked with one another. The interlocking between adjacent turns serves to monitor the play between turns in order to limit the creep phenomenon of the pressure sheath 20 inside this play.

The outermost layer of the pressure vault 28, 31 is a reinforcement layer called back-up pressure vault 31. The back-up pressure vault 31 is made up of one or several non-interlocked wires helically wound with a short pitch, for example wires with a substantially rectangular section. The purpose of the back-up pressure vault 31 is to reinforce the interlocked pressure vault 28 in order to increase the pressure resistance of the pipe 2. The pipes intended to transport hydrocarbons having a very high pressure, they generally comprise such a back-up pressure vault 31. Document U.S.

Pat. No. 6,415,825 describes an example of a flexible pipe comprising an interlocked pressure vault and a back-up pressure vault.

"Wound with a short pitch" means that the absolute value of the spiral angle is close to 90°, typically comprised between 75° and 90°.

Furthermore, the pipe 2 comprises an outer sheath 30 surrounding the traction armor layers 24, 25 and intended to protect the inner layers of the pipe 2.

The pressure sheath 20 is designed to tightly confine the fluid transported in the passage 16. It is made from a polymer material, for example with a base of a polyolefin such as polyethylene, a base of a polyamide such as PA11 or PA12, or a base of a fluorinated polymer such as polyvinylidene fluoride (PVDF).

The thickness of the pressure sheath 20 is for example comprised between 5 millimeters (mm) and 20 mm.

The pressure sheath 20 comprises an end segment 32 inserted in the tip 14.

The carcass 26 is for example formed by a profiled metal sheet, wound in a spiral. The turns of the sheet are advantageously interlocked with one another. The primary function of the carcass 26 is to react the radial crushing forces.

The carcass 26 here is completely metallic.

In this example, the carcass 26 is positioned inside the pressure sheath 20. The pipe is then designated by the term "rough bore" due to the geometry of the carcass 26.

The carcass 26 is able to come into contact with the fluid circulating in the pressure sheath 20.

The helical winding of the profiled metal sheet forming the carcass 26 has a short pitch, i.e., it has a spiral angle with an absolute value close to 90°, typically comprised between 75° and 90°.

The main function of the pressure vault 28, 31 is to react the radial forces related to the pressure prevailing inside the pressure sheath 20.

The interlocked pressure vault 28 defines at least one helical groove 33 over its entire length. The groove 33 is in particular illustrated in FIGS. 1 and 2.

The interlocked pressure vault 28 is for example formed by a metal profiled wire wound in a spiral around the sleeve 20. The profiled wire generally has a complex geometry, in particular in the shape of a Z, T, U, K, X or I.

The interlocked pressure vault 28 is for example wound in a spiral with a short pitch around the pressure sheath 20, i.e., with a spiral angle with an absolute value close to 90°, typically comprised between 75° and 90°.

The interlocked pressure vault 28 has an end region 35 inserted into the tip 14, outside the end segment 32 of the pressure sheath 20. The end segment 32 of the pressure sheath 20 extends axially forward past the end region 35 of the interlocked pressure vault 28.

The flexible pipe 2 according to the invention comprises at least one armor layer 24, 25 formed by a helical winding of at least one elongated armor element 29.

In the example shown in FIG. 2, the flexible pipe 2 comprises a plurality of inner armor layers 24, 25, in particular an inner armor layer 24, pressed on the pressure vault 28, 31 and an outer armor layer 25 around which the outer sheath 30 is positioned.

Each armor layer 24, 25 comprises longitudinal armor elements 29 wound with a long pitch around the axis X-X' of the pipe.

"Wound with a long pitch" means that the absolute value of the spiral angle is less than 60°, and typically comprised between 25° and 55°.

The main function of the armor layers 24, 25 is to react the axial tensile forces exerted on the pipe 2, in particular those related to the suspended weight in the case of a riser.

The armor elements 29 of a first layer 24 are generally wound by an opposite angle relative to the armor elements 29 of a second layer 25. Thus, if the winding angle of the armor elements 29 of the first layer 24 is equal to $+\alpha$, $\alpha$ being comprised between 25° and 55°, the winding angle of the armor elements 29 of the second armor layer 25 positioned in contact with the first armor layer 24 is for example equal to $-\alpha$.

The armor elements 29 are for example formed by metal wires, in particular ferromagnetic steel wires, or strips of composite material, for example reinforced carbon fiber strips. In the example illustrated in FIG. 2, the armor elements 29 are for example formed by ferromagnetic steel wires.

The armor elements 29 each have an end segment 34 inserted into the tip 14. The end segment 34 extends to a free end 36 positioned in the tip 14. It advantageously has a pseudo-spiral trajectory with axis X-X' in the tip 14, the spiral winding on a conical enclosure.

In the example shown in FIG. 2, for each armor layer 24, 25, the end segments 34 of the armor elements 29 extend diverging away from the axis X-X', then converging toward the axis X-X' from a rear unsticking point 62 toward the free front end 36.

The outer sheath 30 is designed to prevent the permeation of fluid from the outside of the flexible pipe 2 toward the inside. It is advantageously made from a polymer material, in particular with a base of a polyolefin, such as polyethylene, or a base of a polyamide, such as PA11 or PA12.

The thickness of the outer sheath 30 is for example comprised between 5 mm and 15 mm.

The back-up pressure vault 31 is arranged outwardly relative to the interlocked pressure vault 28. The back-up pressure vault 31 is interposed between the interlocked pressure vault 28 and the armor elements 29 of the first armor layer 24.

The thickness of the back-up pressure vault 31 is for example comprised between 5 mm and 30 mm.

The back-up pressure vault 31 comprises a bearing ring 31A mounted engaged around the back-up pressure vault 31.

As illustrated by FIG. 2, aside from the end segment 32 of the pressure sheath 20, the end segments 34 of the armor elements 29, and the end region 35 of the interlocked pressure vault 28, each tip 14 comprises an end vault 50 and an outer connecting cover 51 protruding axially toward the rear from the vault 50. The cover 51 delimits, with the end vault 50, a chamber 52 for receiving the end segments 34 of the armor elements 29, and the end region 35 of the interlocked pressure vault 28.

The tip 14 further comprises, in front of the receiving chamber 52, a front sealing assembly 54 around the pressure sheath 20 and a locking system 55 of the interlocked pressure vault 28 relative to the end vault 50. The tip 14 also comprises a rear sealing assembly 56 around the outer sheath 30.

In this example, the end vault 50 is intended to connect the pipe 2 to another connecting tip 14 or to terminal equipment, advantageously by means of an end flange.

The end vault 50 has a central bore intended to receive the end of the pressure sheath 20 and allow the flow of the fluid circulating through the central passage 16 toward the outside of the pipe 2.

The cover 51 comprises a tubular peripheral wall 70 extending around the axis X-X'. The peripheral wall 70 has a rear edge 72 extending axially backward past the end vault 50.

The cover 51 delimits the chamber 52 radially toward the outside. The end vault 50 and the end segment 32 of the pressure sheath 20 delimit the chamber 52 radially inwardly.

The receiving chamber 52 is advantageously filled with a filler material intended to anchor the end segments 34 of the armor elements 24, 25 in the chamber 52. The filler material is for example an epoxy resin such as an Araldite® resin.

The front sealing assembly 54 and the end region 35 of the interlocked pressure vault 28 are located radially inward relative to the armor elements 29. The rear sealing assembly 56 axially delimits the chamber 52 toward the rear. A maintaining ring 75B of the armor elements 29 is located between the front end of the outer sheath 30 and the front end of the first armor layer 25.

The front sealing assembly 54 is situated in front of the tip 14, in contact with the end vault 50.

It comprises a front crimping ring 86, intended to engage on the pressure sheath 20, and a front crimping flange 87 of the ring 86, shown schematically in FIG. 2.

The front flange 87 is attached on a rear transverse surface of the end vault 50. It is arranged outwardly relative to the end region 35 of the interlocked pressure vault 28.

The front crimping flange 87 axially pushes the front crimping ring 86 forward so that the latter exerts radial pressure on the end segment 32 of the pressure sheath 20. In particular, the movement of the front ring 86 against an inclined surface of the vault 50 radially moves the front crimping ring 86, such that the latter is radially engaged on the pressure sheath 20.

The front crimping flange 87 is advantageously connected to the bearing ring 31A via connecting tie rods 31B.

Figure 3:
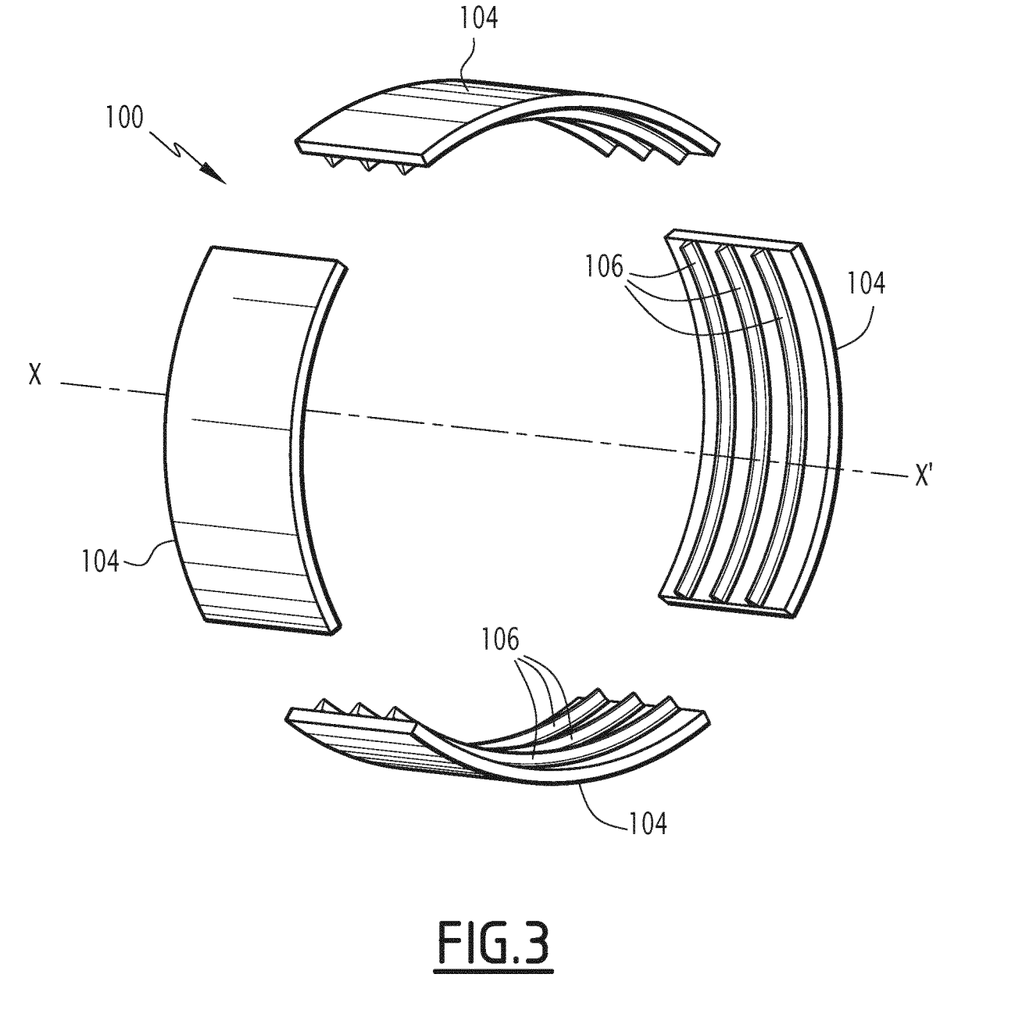
FIG. 3 is a perspective view of a locking system in the tip of FIG. 2.

As illustrated in FIGS. 1 to 3, the locking system 55 comprises an end ring 99 of the interlocked pressure vault 28 and a curved holding assembly 100 mounted radially between the end region 35 of the interlocked pressure vault 28 and the front crimping flange 87.

The locking system 55 further comprises members 102 for axial locking of the holding assembly 100 on the front gripping flange 87.

In the embodiment illustrated in FIG. 2, the holding assembly 100 is inserted into a rear shoulder 95 defined by the front crimping flange 87.

As shown in FIGS. 1 and 3, the holding assembly 100 comprises at least two separate circumferential members 104.

In the example illustrated in FIGS. 1 to 3, the holding assembly 100 comprises four separate circumferential members 104.

Each circumferential member 104 is in the form of a curved plate. The angular expanse around the axis X-X' of each circumferential member 104 is less than 120°, preferably less than 90°.

The circumferential members 104 are distributed along the perimeter of a same cross-section of the interlocked pressure vault 28. Thus, the circumferential members 104 are arranged adjacent to one another on the perimeter of the interlocked pressure vault 28.

The circumferential members 104 are spaced circumferentially apart from one another on the interlocked pressure vault 28 by no more than 10 millimeters.

As shown in FIG. 3, each circumferential member 104 comprises ribs 106 complementary to successive turns of the groove 33 of the interlocked pressure vault 28. The ribs 106 protrude radially toward the axis X-X'. In particular, the ribs 106 are axially separated by a distance corresponding to the pitch of the groove 33.

Preferably, the ribs 106 of the circumferential members 104 of the holding assembly 100 are inserted without being screwed in the groove 33 of the interlocked pressure vault 28.

In this example, the circumferential members 104 are made from carbon steel.

The locking members 102 traverse the front crimping flange 87 via passages 110 and protrude in the rear shoulder 95 defined by the front crimping flange 87.

Advantageously, each circumferential member 104 of the holding assembly 100 is across from at least one passage 110 of the front crimping flange 87 in which a locking member 102 is inserted. Thus, each circumferential member 104 is kept pressed against the interlocked pressure vault 28 by at least one locking member 102.

The locking members 102 are advantageously chosen from among bolts, headless screws, blunt end screws and cup-point screws. The locking members 102 are for example set screws.

In the embodiment illustrated in FIG. 2, the passages 110 are threaded passages traversing the front crimping flange 87 and the locking members 102 are blunt end screws or cup-point screws screwed into the passages 110. The blunt ends or cup-point ends of the screws exert axial pressure on the circumferential members 104 of the holding assembly 100.

The rear sealing assembly 56 is placed behind the front sealing assembly 54.

It comprises at least one rear crimping ring 88 crimping the outer sheath 30, and a rear flange 90 for gripping the rear ring 88, fastened on the cover 51.

The method for mounting the connection tip 14 of the flexible line 2 will now be described.

Initially, the method comprises providing the flexible line 2. An end segment 32 of the pressure sheath 20 is stripped.

The end region 35 of the interlocked pressure sheath 28, arranged outwardly relative to the end segment 32 of the pressure sheath 20, is also stripped.

The bearing ring 31A of the back-up pressure vault 31 is placed around the latter.

The holding assembly 100 is then mounted on the end region 35 of the interlocked pressure vault 28.

To that end, the circumferential members 104 are pressed radially against the end region 35 while being spaced on the perimeter of a same section of the region 35. The ribs 106 of the circumferential members 104 of the holding assembly 100 are inserted radially without being screwed in the groove 33 of the interlocked pressure vault 28.

Then, the front crimping flange 87 is mounted around the end region 35 of the interlocked pressure vault 28, such that the holding assembly 100 is contained in the rear shoulder 95 defined by the front crimping flange 87.

Then, the front crimping ring 86 is inserted around the end segment 32 of the pressure sheath 20 in front of the front crimping flange 87.

The end vault 50 is next inserted around the end segment 32 of the pressure sheath 20.

The front crimping flange 87 is then pushed forcibly until it abuts against the rear face of the end vault 50, causing the crimping of the pressure sheath 20. The axial displacement of the front crimping flange 87 toward the rear face of the end vault 87 is advantageously done using a tool provided with hydraulic cylinders, known by those skilled in the art.

Once the crimping of the pressure sheath is complete, the front crimping flange is fastened to the end vault 50 using several screws.

The locking members 102 are next inserted into the passage 110 of the front crimping flange 87 to exert pressure on the circumferential members 104 of the holding assembly 100 and thus to keep the holding assembly 100 in the rear shoulder 95 defined by the front crimping flange 87.

Once this operation is complete, the end region 35 of the interlocked pressure vault 28 is fastened to the end vault 50 of the tip 14, this fastening being done via the front crimping flange 87, screws connecting the front crimping flange 87 to the end vault 50, circumferential members 104 and the holding assembly 100.

The connecting tie rods 31B between the front crimping flange 87 and the bearing ring 31A are then placed and are respectively fastened on the front flange 87 and the bearing ring 31A.

Thus, the locking system 55 locks the interlocked pressure vault 28 relative to the end vault 50, which reduces the risks of relative movement, or even loss of sealing of the tip 14.

Indeed, when the pipe 2 transports a high-pressure fluid, the pressure exerted by this fluid results in exerting, on the tip 14, an axial force tending to separate the tip 14 from the central segment 12. Such a pulling out force, called background effect, potentially accumulates with the pulling out effect related to the suspended weight of the pipe in the case where the latter is used for a riser. These pulling out forces are reacted by the traction armors 24, 25 and by the anchoring thereof in the tip 14. However, it has been noted that under extreme temperature and pressure conditions, the anchoring system of the traction armors 24, 25 may not be sufficient to completely immobilize the end of the interlocked pressure vault 28 with respect to the tip 14, and in particular with respect to the front crimping flange 87. Yet in the absence of complete immobilization, the play separating the end of the interlocked pressure vault 28 from the rear face of the gripping flange 87 may increase slightly, which could, under extreme temperature and pressure conditions, lead to excessive creep of the pressure sheath 20 inside this excessive play, and subsequently to a loss of sealing of the tip 14. By completely locking the end of the interlocked pressure vault 28 with respect to the tip 14, the present invention prevents the formation of excessive play and therefore improves the reliability of the tip 14, in particular when the pipe is transporting hydrocarbons having a very high pressure and temperature (for example a pressure of 1500 bars and a temperature of 150° C.).

The holding assembly 100 formed by separate circumferential members 104 adapts to different interlocked pressure vault 28 geometries. In particular, such a holding assembly 100 is adaptable to pressure vaults having circularity flaws.

The insertion of ribs 106 of the holding assembly 100 into the grooves 33 of the interlocked pressure vault 28 without screwing facilitates the manufacture of the interlocked pressure vault 28 and the holding assembly 100, as well as the mounting of the holding assembly 100 on the interlocked pressure vault 28.

Figure 4:
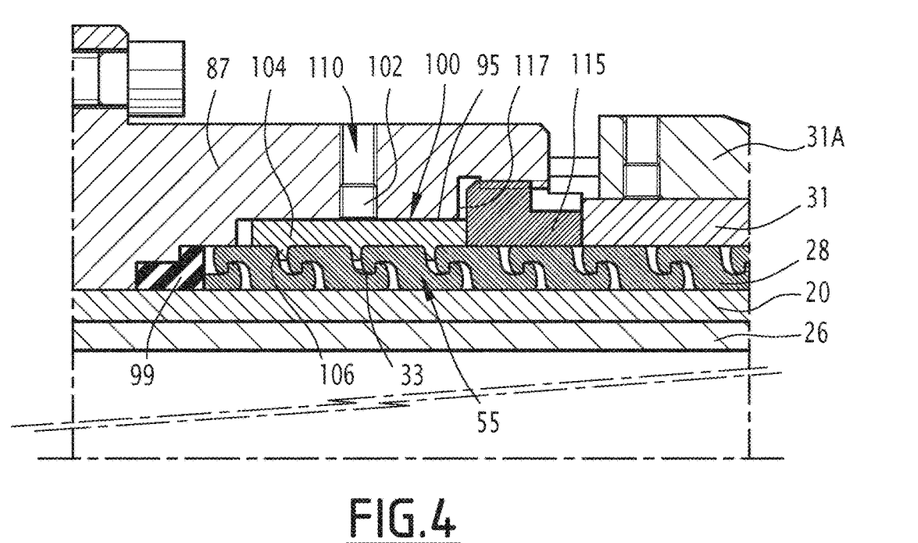
FIG. 4 is a sectional view, in an axial median plane, of the relevant parts of a flexible pipe tip according to a second embodiment of the invention.

According to a second embodiment as shown in FIG. 4, the elements identical to the tip 14 according to the first embodiment described in light of FIG. 2 are not repeated. Only the differences are shown.

The locking system 55 comprises a holding ring 115 arranged radially between the interlocked pressure vault 28 and the front crimping flange 87 behind the holding assembly. The holding ring 115 is in contact with the holding assembly 100.

The front crimping flange 87 defines an outer shoulder 117 placed behind the rear shoulder 95, the outer shoulder 117 receiving the holding ring 115.

The front flange 87 has an inner thread in the outer shoulder 117, to allow the screwing of the holding ring 115.

The holding ring 115 is interposed between the holding assembly 100 and the back-up pressure vault 31.

In the example of FIG. 4, the locking members 102 are screws.

The steps of the method for mounting the tip 14 according to the second embodiment illustrated in FIG. 4 identical to the steps of the mounting method according to the first embodiment illustrated in FIG. 2 are not repeated. Only the differences are shown.

The mounting method comprises the prior placement of the holding ring 115, around the interlocked pressure vault 28, in front of the back-up pressure vault 31.

Then, the method comprises placing circumferential members 100 in front of the holding ring 115.

As previously described, the end vault 50 is next inserted around the holding assembly 100 so that each circumferential member enters the shoulder 95.

The holding ring 115 is then screwed in the outer shoulder 117.

Thus, in this example, the holding assembly 100 is locked both in the transverse direction and the longitudinal direction.

Figure 5:
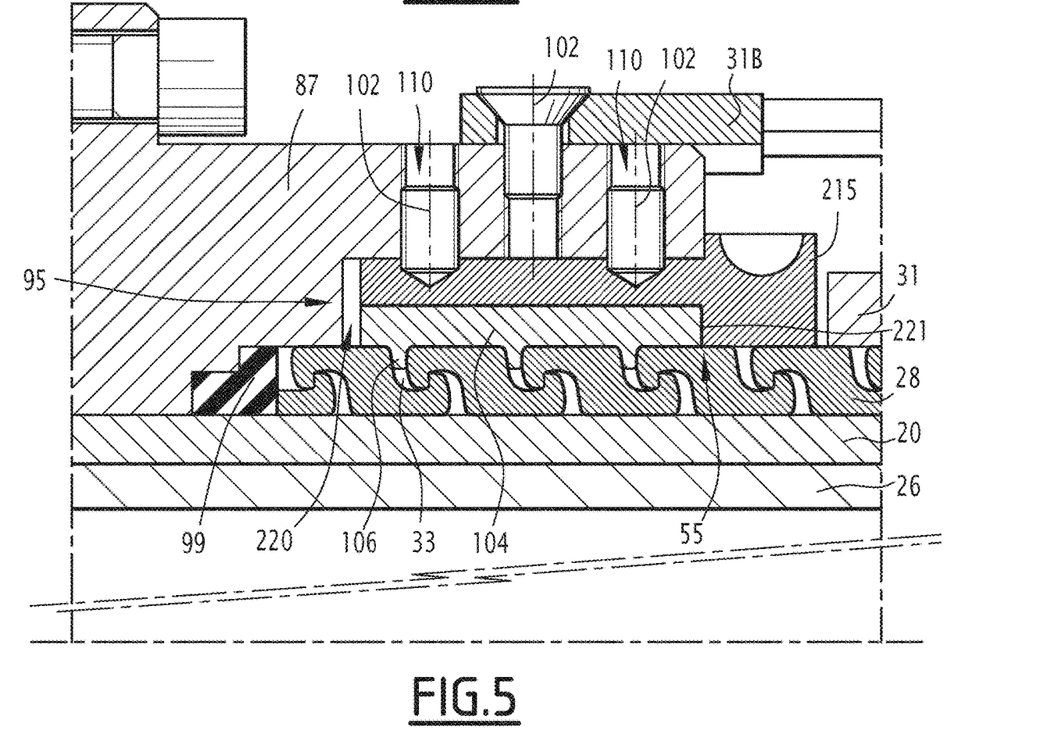
FIG. 5 is a sectional view, in an axial median plane, of the relevant parts of a flexible pipe tip according to a third embodiment of the invention.

According to a third embodiment as shown in FIG. 5, the elements identical to the tip 14 according to the first embodiment described in light of FIG. 2 are not repeated. Only the differences are shown.

The locking system 55 further comprises a holding ring 215 arranged in the shoulder 95 between the holding assembly 100 and the front cramping flange 87. The holding ring 215 is arranged outwardly relative to the holding assembly 100 and is pressed on the holding assembly 100.

The holding ring 215 is received in the rear shoulder 95 jointly with the holding assembly 100.

The holding ring 215 forms, with the interlocked pressure vault 28, a housing 220 for maintaining the holding assembly 100, the holding assembly 100 being inserted into the maintaining housing 220. The holding ring 215 defines a rear stop 221 for locking the holding assembly 100 in the housing 220.

The holding ring 215 is made up of at least two ring parts assembled on one another.

The locking members 102 traverse the front crimping flange 87 via the passages 110 and protrude in the rear shoulder 95 so as to exert pressure on the front holding ring 215. Thus, in this third embodiment, the locking members 102 are in contact with the holding ring 215. The holding assembly 100 is held in the maintaining housing 220 defined by the holding ring 215 by cooperation with the rear stop 221.

In the example of FIG. 5, the locking members 102 are headless screws and blunt end screws. The headless screws make it possible, for example, to lock the holding ring 215 and the blunt end screws make it possible to connect the front crimping flange 87 to the bearing ring 31A via the connecting tie rods 31B arranged outwardly relative to the front flange 87 and the bearing ring 31A.

The steps of the method for mounting the tip 14 according to the third embodiment illustrated in FIG. 5 identical to the steps of the mounting method according to the first embodiment illustrated in FIG. 2 are not repeated. Only the differences are shown.

The mounting method comprises placing circumferential members 104, as previously described.

The two parts of the holding ring 215 are then mounted around circumferential members 104 in order to cover the circumferential members 104 of the holding assembly 100 and place the stop 221 behind the circumferential members 104.

The end vault 50 is then placed on the holding assembly 100 and the holding ring 215 is inserted in the shoulder 95.

Figure 6:
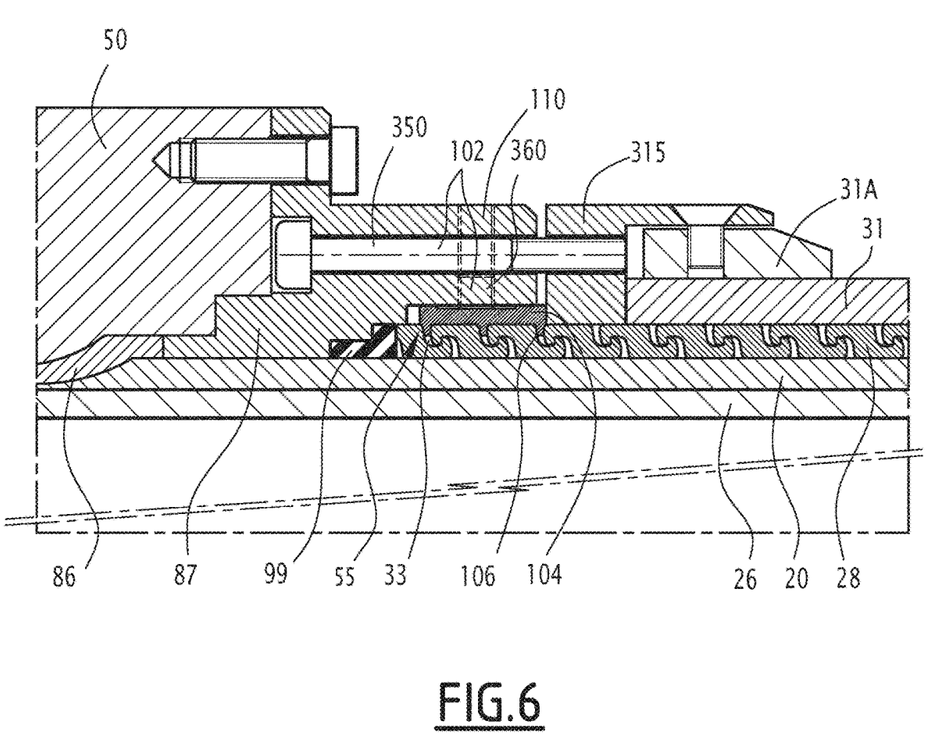
FIG. 6 is a sectional view, in an axial median plane, of the relevant parts of a flexible pipe tip according to a fourth embodiment of the invention.

According to a fourth embodiment as shown in FIG. 6, the elements identical to the tip 14 according to the first embodiment described in light of FIG. 2 are not repeated. Only the differences are shown.

The locking system 55 comprises a holding ring 315 arranged axially between the front crimping flange 87 and the end of the back-up pressure vault 31. The holding ring 315 surrounds the interlocked pressure vault 28 and is in contact with the rear face of the holding assembly 100.

In the example of FIG. 6, the locking members 102 are, on the one hand, screws 360 oriented radially, and on the other hand, screws 350 oriented longitudinally. The screws oriented longitudinally 350 connect the front gripping flange 87 to the holding ring 315 and serve to lock the holding ring 350 longitudinally while keeping it in contact against the rear face of the holding assembly 100. The screws oriented radially 360 primarily serve to provide good penetration of the ribs 106 of the holding assembly 100 into the groove 33 of the interlocked pressure vault 28.

The steps of the method for mounting the tip 14 according to the second embodiment illustrated in FIG. 6 identical to the steps of the mounting method according to the first embodiment illustrated in FIG. 2 are not repeated. Only the differences are shown.

The mounting method comprises the prior placement of the holding ring 315, around the interlocked pressure vault 28, in front of the back-up pressure vault 31.

Then, the method comprises placing circumferential members 100 and the front crimping flange in front of the holding ring 315.

The holding assembly 100 is next locked in both the transverse direction and the longitudinal direction by tightening the screws oriented radially 360 and the screws oriented longitudinally 350.

Then, the front crimping ring 86 and the end vault are placed around the pressure sheath 20.

Lastly, the crimping of the pressure sheath 20 is done by bringing the end vault 50 longitudinally closer to the front crimping flange 87 until these two parts are abutting against one another.

One skilled in the art will understand that separate members are members having no direct mechanical connection to one another.

The invention claimed is:

1. A connection end-fitting for a flexible fluid transport line; the flexible line comprising a pressure sheath, an interlocked pressure vault arranged outwardly relative to the pressure sheath and at least one traction armor layer arranged outwardly relative to the interlocked pressure vault, the armor layer comprising a plurality of armor elements; the end-fitting comprising:
an end region of the interlocked pressure vault,
at least one end segment of each armor element,
an end vault and a cover fastened on the end vault, the end vault and the cover defining a chamber between them for receiving each end segment of the armor elements,
a front crimping flange of the pressure sheath attached on the end vault and arranged outwardly relative to the end region of the interlocked pressure vault, and
a locking system configured to lock the interlocked pressure vault relative to the end vault;
wherein the locking system comprises a curved holding assembly radially mounted between the end region of the interlocked pressure vault and the front crimping flange.

2. An end-fitting according to claim 1, wherein the holding assembly comprises at least two separate circumferential members.

3. An end-fitting according to claim 2, wherein each circumferential member is in the form of a curved plate.

4. An end-fitting according to claim 2, wherein the circumferential members are distributed along the perimeter of a same cross-section of the interlocked pressure vault.

5. An end-fitting according to claim 2, wherein the circumferential members are spaced circumferentially apart from one another on the interlocked pressure vault by not more than 10 millimeters.

6. An end-fitting according to claim 2, wherein the circumferential members are made from carbon steel.

7. An end-fitting according to claim 1, wherein the interlocked pressure vault comprises at least one groove, and the holding assembly comprising ribs complementary to and received in the groove.

8. An end-fitting according to claim 7, wherein the ribs of the holding assembly are inserted without being screwed in the groove of the interlocked pressure vault.

9. An end-fitting according to claim 1, wherein the locking system comprises axial locking members configured for axially locking the holding assembly on the front crimping flange; the axial locking members being selected from the group consisting of bolts, headless screws, blunt end screws, and cup-point screws.

10. An end-fitting according to claim 1, wherein the locking system comprises a holding ring arranged between the interlocked pressure vault and the front crimping flange and the contact ring is in contact with the holding assembly.

11. An end-fitting according to claim 10, wherein the holding ring forms, together with the interlocked pressure vault, a housing for maintaining the holding assembly,
wherein the holding assembly is inserted into the maintaining housing.

12. A method for mounting an end-fitting according to claim 1, the method comprising:
providing the end region of the interlocked pressure vault arranged around the pressure sheath;
placing the front crimping flange around the end region of the interlocked pressure vault,
mounting the front crimping flange on the end vault;
mounting the locking system configured to lock the interlocked pressure vault.

13. The method according to claim 12, wherein the holding assembly comprises at least two separate circumferential members;
the method comprising pressing, without screwing on, each circumferential member on the interlocked pressure vault.

14. An end-fitting according to claim 1, wherein the holding assembly comprises at least three separate circumferential members.

15. A flexible line, comprising:
at least one pressure sheath;
at least one interlocked pressure vault arranged outwardly relative to the pressure sheath;
at least one traction armor layer arranged outwardly relative to the interlocked pressure vault, the armor layer comprising a plurality of armor elements; and
at least one end-fitting comprising:
an end region of the interlocked pressure vault,
at least one end segment of each armor element,
an end vault and a cover fastened on the end vault, the end vault and the cover defining a chamber between them for receiving each end segment of the armor elements,
a front crimping flange of the pressure sheath attached on the end vault and arranged outwardly relative to the end region of the interlocked pressure vault, and
a locking system configured to lock the interlocked pressure vault relative to the end vault, and the locking system comprises a curved holding assembly radially mounted between the end region of the interlocked pressure vault and the front crimping flange.

* * * * *